(12) United States Patent
Tan et al.

(10) Patent No.: US 10,504,172 B2
(45) Date of Patent: Dec. 10, 2019

(54) SYSTEMS AND METHODS FOR COLLECTING AND UPDATING ONLINE PRODUCT CONTENT

(71) Applicant: WAL-MART STORES, INC., Bentonville, AR (US)

(72) Inventors: Jonathan Tan, Sunnyvale, CA (US); Ganesh Krishnan, Fremont, CA (US); Scott Fish, San Carlos, CA (US); Rohit Deep, Union City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 317 days.

(21) Appl. No.: 15/401,555

(22) Filed: Jan. 9, 2017

(65) Prior Publication Data
US 2018/0197230 A1    Jul. 12, 2018

(51) Int. Cl.
*G06Q 30/00* (2012.01)
*G06Q 30/06* (2012.01)
*G06F 17/27* (2006.01)

(52) U.S. Cl.
CPC ..... *G06Q 30/0641* (2013.01); *G06Q 30/0609* (2013.01); *G06Q 30/0619* (2013.01); *G06F 17/2705* (2013.01); *G06Q 2230/00* (2013.01)

(58) Field of Classification Search
CPC ..... G06Q 30/06; G06Q 30/0601–0643; G06Q 30/08; G06Q 2230/00; G06Q 30/241–277
See application file for complete search history.

(56) References Cited

U.S. PATENT DOCUMENTS

| | | | |
|---|---|---|---|
| 2007/0118441 A1* | 5/2007 | Chatwani | G06Q 30/0603 705/27.1 |
| 2010/0324968 A1* | 12/2010 | Schoettle | G06F 17/30545 705/14.54 |
| 2011/0119117 A1* | 5/2011 | Yu | G06Q 30/0601 705/12 |
| 2012/0029978 A1 | 2/2012 | Olding et al. | |
| 2012/0265573 A1 | 10/2012 | Van Pelt et al. | |

(Continued)

OTHER PUBLICATIONS

The Effect of Online Consumer Reviews on New Product Sales. Oct. 2012. Geng Cui. Lignan University. (Year: 2012).*

*Primary Examiner* — William J Allen
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of determining that content for a product in an electronic catalog for display on a webpage of an online retailer comprises incorrect content or is missing content, coordinating a first display on mobile electronic devices of a plurality of users of a request to provide additional content that (1) replaces the incorrect content for the product in the electronic catalog or (2) provides the missing content for the product in the electronic catalog, receiving the additional content for the product from the mobile electronic devices of the plurality of users, and coordinating a second display of the additional information of the product on the one or more webpages of the online retailer.

20 Claims, 5 Drawing Sheets

(56) References Cited

U.S. PATENT DOCUMENTS

| | | | |
|---|---|---|---|
| 2014/0052568 A1* | 2/2014 | Robinson | G06Q 30/0201 |
| | | | 705/26.7 |
| 2015/0120462 A1* | 4/2015 | Zhang | G06Q 30/0267 |
| | | | 705/14.64 |
| 2017/0186032 A1* | 6/2017 | Rangasamy Kannadasan | ............ |
| | | | G06Q 30/0248 |

* cited by examiner

SYSTEMS AND METHODS FOR COLLECTING AND UPDATING ONLINE PRODUCT CONTENT

TECHNICAL FIELD

This disclosure relates generally to collecting and updating online product content.

BACKGROUND

Product content is used on webpages of a product to provide useful information and/or photographs of the product to potential customers. Often times, the product content on webpages for the product includes missing or incorrect information due to insufficient or incorrect information provided by suppliers.

BRIEF DESCRIPTION OF THE DRAWINGS

To facilitate further description of the embodiments, the following drawings are provided in which.

Figure 1:
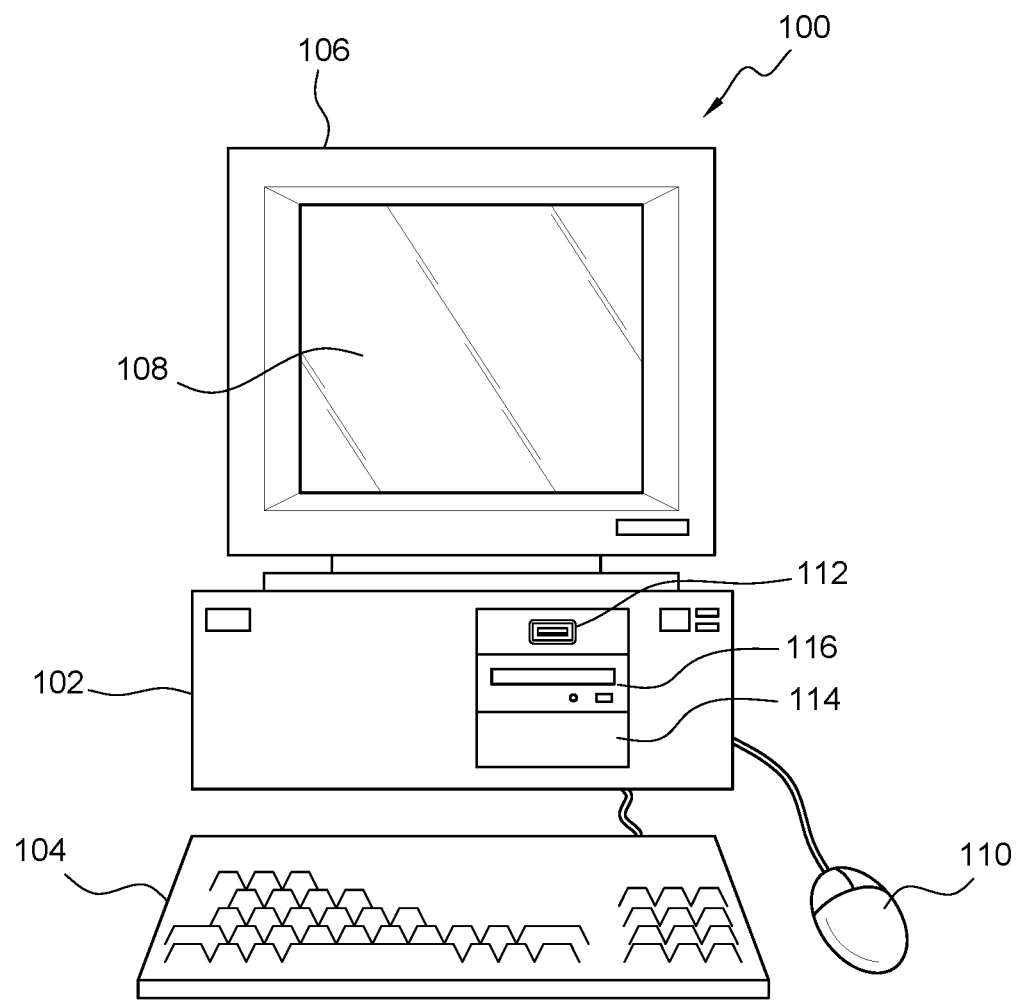
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of determining that content for a product in an electronic catalog for display on one or more webpages of an online retailer comprises incorrect content or is missing content. The one or more storage modules also can be configured to run on the one or more processing modules and perform an act of coordinating a first display on mobile electronic devices of a plurality of users of a request to provide additional content that (1) replaces at least a portion of the incorrect content for the product in the electronic catalog of the online retailer or (2) provides at least a portion of the missing content for the product in the electronic catalog of the online retailer. The one or more storage modules also can be configured to run on the one or more processing modules and perform an act of receiving the additional content for the product from the mobile electronic devices of the plurality of users. The one or more storage modules also can be configured to run on the one or more processing modules and perform an act of saving the additional content for the product in a database of the online retailer. The one or more storage modules also can be configured to run on the one or more processing modules and perform an act of matching the additional content for the product to the content of the product in the electronic catalog of the online retailer. The one or more storage modules also can be configured to run on the one or more processing modules and perform an act of coordinating a second display of the additional information of the product on the one or more webpages of the online retailer.

Various embodiments include a method. The method can include determining that content for a product in an electronic catalog for display on one or more webpages of an online retailer comprises incorrect content or is missing content. The method also can include coordinating a first display on mobile electronic devices of a plurality of users of a request to provide additional content that (1) replaces at least a portion of the incorrect content for the product in the electronic catalog of the online retailer or (2) provides at least a portion of the missing content for the product in the electronic catalog of the online retailer. The method also can include receiving the additional content for the product from the mobile electronic devices of the plurality of users. The method also can include saving the additional content for the product in a database of the online retailer. The method also can include matching the additional content for the product to the content of the product in the electronic catalog of the online retailer. The method also can include coordinating a second display of the additional information of the product on the one or more webpages of the online retailer.

Figure 2:
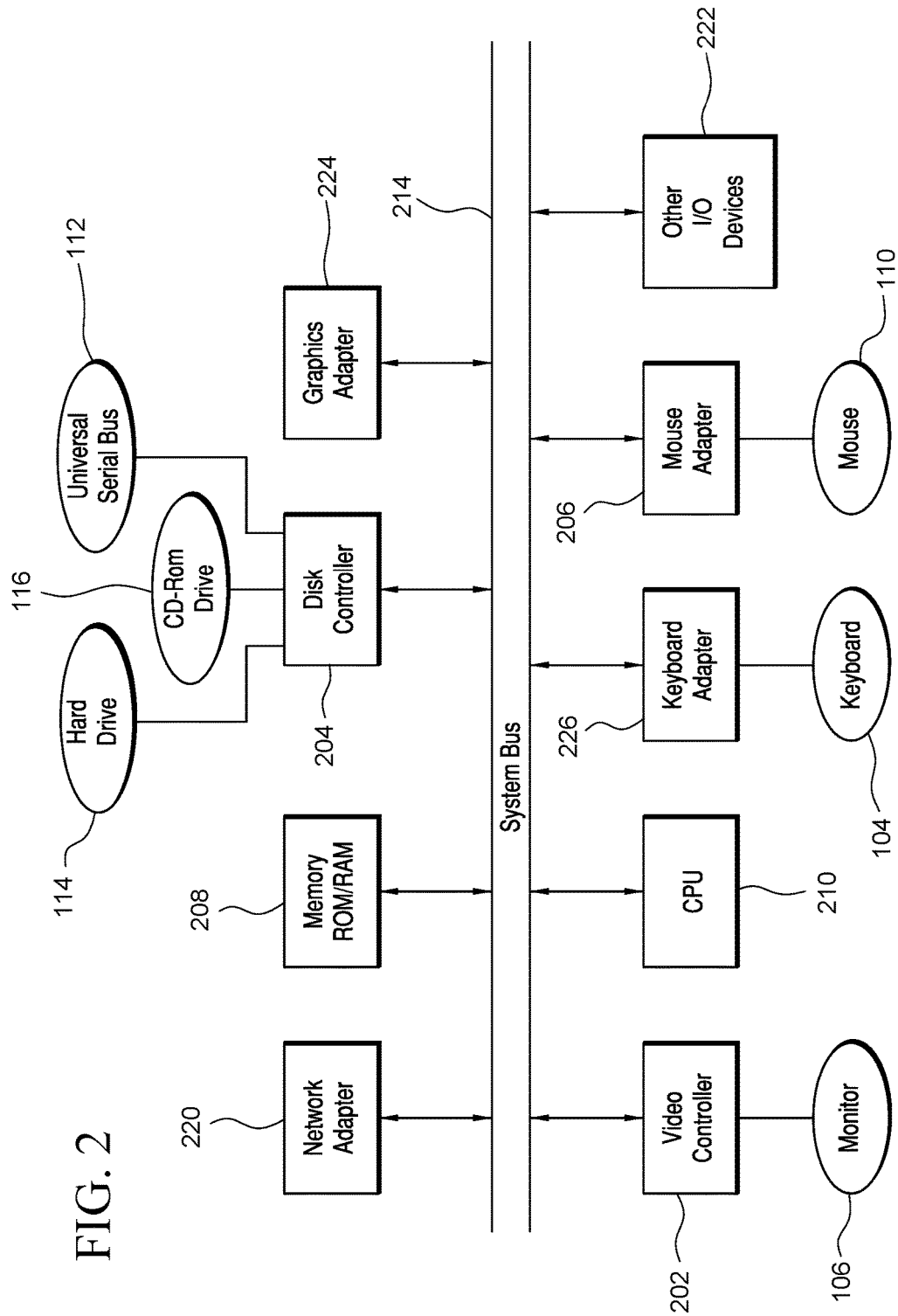
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
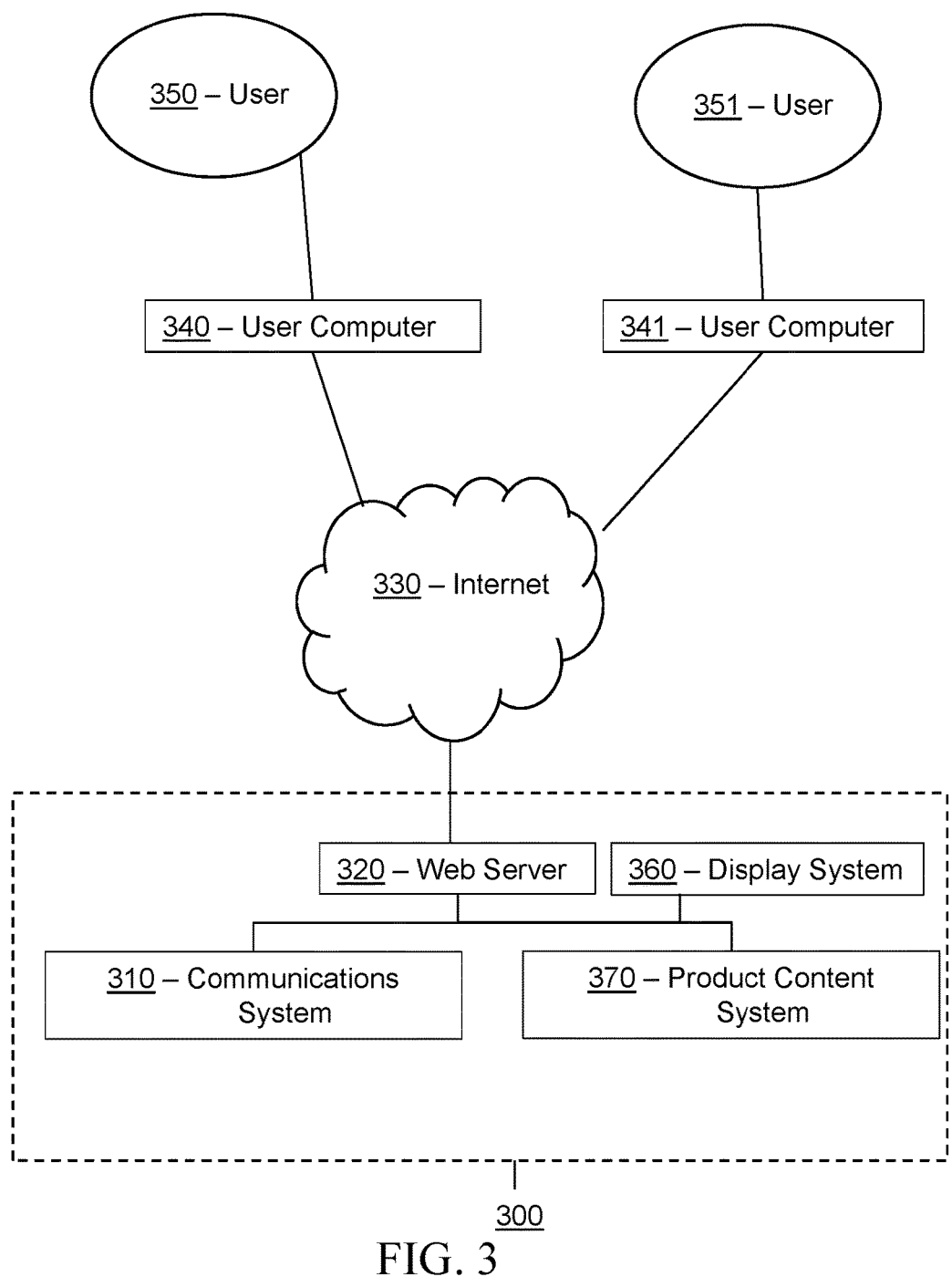
FIG. 3 illustrates a representative block diagram of a system, according to an embodiment.

Turning ahead in the drawings, FIG. 3 illustrates a block diagram of a system 300 that can be employed for collecting and updating online product content. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communications system 310, a web server 320, a display system 360, and a product content system 370. Communications system 310, web server 320, display system 360, and/or product content system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communications system 310, web server 320, display system 360, and/or product content system 370. Additional details regarding communications system 310, web server 320, display system 360, and product content system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, communications system 310, web server 320, display system 360, and/or product content system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communications system 310, web server 320, display system 360, and/or product content system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communications system 310, web server 320, display system 360, and/or product content system 370. In a similar manner, the processing module(s) and the memory storage module(s) can be local and/or remote to each other.

In many embodiments, communications system 310, web server 320, display system 360, and/or product content system 370 can be configured to communicate with one or more customer computers 340 and 341. In some embodiments, customer computers 340 and 341 also can be referred to as user computers. In some embodiments, communications system 310, web server 320, display system 360, and/or product content system 370 can communicate or interface (e.g. interact) with one or more customer computers (such as customer computers 340 and 341) through a network or internet 330. Internet 330 can be an intranet that is not open to the public. Accordingly, in many embodiments, communications system 310, web server 320, display system 360, and/or product content system 370 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communications system 310, web server 320, display system 360, and/or product content system 370 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communications system 310, web server 320, display system 360, and/or product content system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
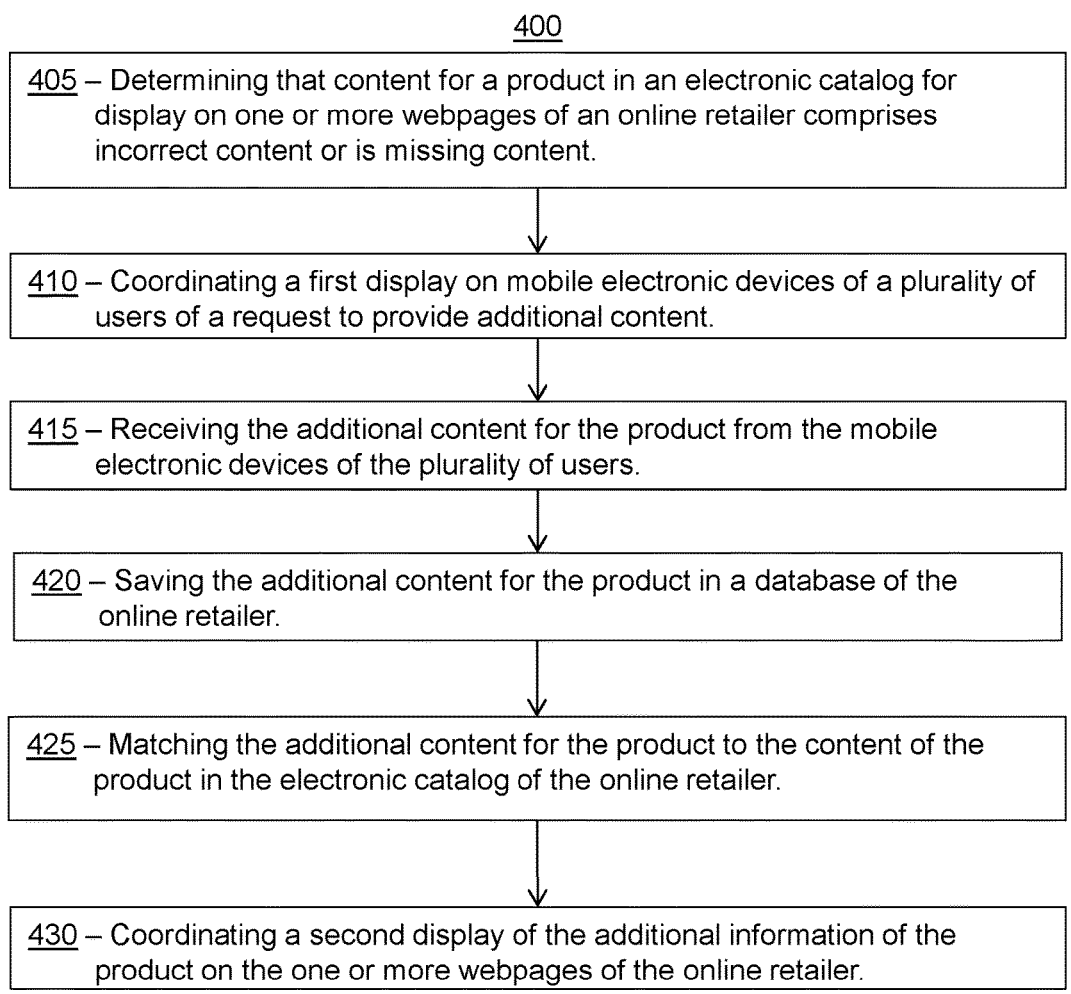
FIG. 4 is a flowchart for a method, according to certain embodiments.
Figure 5:
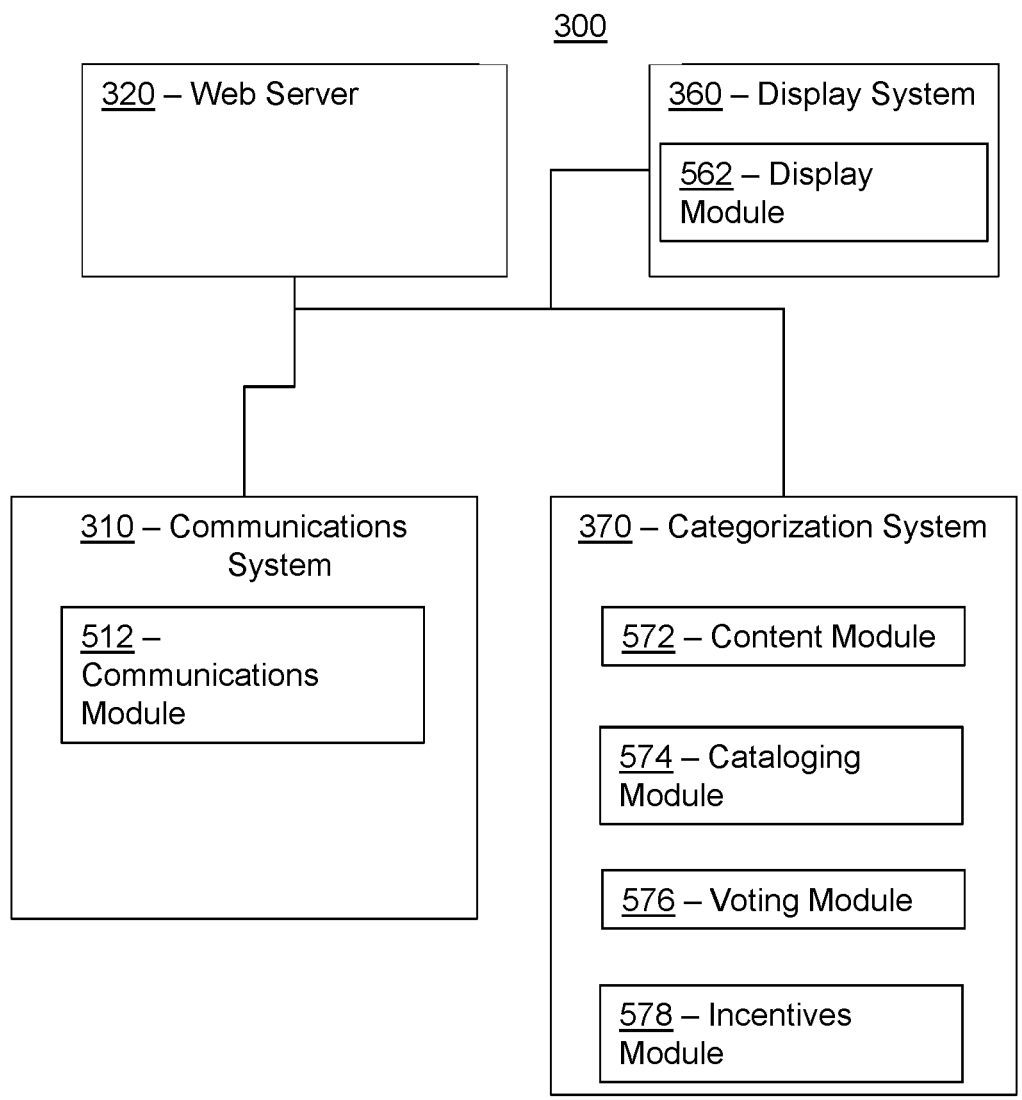
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, 574, 576, and/or 578 (FIG. 5). Such non-transitory memory storage modules can be part of a computer system such as communications system 310, web server 320, display system 360, and/or product content system 370 (FIGS. 3 & 5). The processing module(s) can be similar or identical to the processing module(s) described above with respect to computer system 100 (FIG. 1).

One or more embodiments of method 400 allow users to easily collect and curate content for one or more physical products. As shall be described in greater detail below, in some embodiments a user is able to (1) provide content for a product, such as scan a barcode of a product, take photos of a product, and enter titles, descriptions and other attributes for a products, (2) vote on what content the user believes is the best, (3) manage a user profile, (4) manage account/payment information, and/or (5) view an incentivized leaderboard for providing content.

Method 400 can comprise an activity 405 of determining that content for a product in an electronic catalog for display on one or more webpages of an online retailer comprises incorrect content or is missing content. In some embodiments, the electronic catalog can comprise products for online shopping online, while in other embodiments, the electronic catalog also can be associated with one or more products at a physical brick and mortar store.

In some embodiments, determining that content for the product in the electronic catalog comprises incorrect content or missing content can occur after system 300 (FIG. 3) has received a product identifier from a user and then looked up the product associated with the product identifier in the electronic catalog. For example, in a user-driven workflow, as described in greater detail below, a user can proactively capture an image of a product identifier using a mobile electronic device, and then transmit that image to the online retailer. Method 400 can then optionally comprise an activity receiving the product identifier for the product from one of the mobile electronic devices of one of the plurality of users before or after determining that the content for the product in the electronic catalog for display on the one or more webpages of the online retailer comprises the incorrect content or is the missing content.

Returning to FIG. 4, method 400 can further comprise an activity 410 of coordinating a first display on mobile electronic devices of a plurality of users of a request to provide additional content. More particularly, activity 410 can comprise coordinating a first display on mobile electronic devices of a plurality of users of a request to provide additional content that (1) replaces at least a portion of the incorrect content for the product in the electronic catalog of the online retailer or (2) provides at least a portion of the missing content for the product in the electronic catalog of the online retailer. In embodiments comprising coordinating a first display on mobile electronic devices of a plurality of users of a request to provide, the additional content can comprise an online retailer-driven workflow. That is, the online retailer drives the workflow of the method by coordinating and/or sending requests to users to provide additional content.

In some embodiments, method 400 can further comprise an activity of determining that the additional content influences purchasers to buy the product more than other content of the missing content or the incorrect content. Thus, the requested additional content can be specific to additional content that is more influential for purchasers in deciding to buy the product. Requested additional content can vary according to what is incorrect or missing for the product in the electronic catalog. For example, requested additional content can comprise a plurality of photographs of the product taken by the plurality of users on the electronic mobile devices. Requested additional content also can comprise a plurality of concrete attributes for the product. The plurality of concrete attributes can comprise one or more of a brand, a key descriptor, a product type, or a model number, etc. Requested additional content also can comprise a plurality of abstract attributes for the product. The plurality of abstract attributes can comprise one or more of an occasion attribute, a style attribute, or a descriptive attribute, etc.

In some embodiments, if the request for additional content comprises at least a request for the plurality of photographs, method 400 can further comprise activities of coordinating a third display of photo-taking tips on the mobile electronic device of the plurality of users. The photo-taking tips can comprise but are not limited to recommending a white or other plain background, prompting or requiring the user to take photos at certain angles, and making sure photos are in focus. In some embodiments, a user is able to access a camera of the mobile electronic device, provide editing capabilities for the photos (such as editing out a background in the photo), and/or re-take photos from within an application or other software installed on the mobile electronic device for the express purpose of collecting content for the online retailer. In some embodiments, method 400 can comprise an activity of coordinating a display on the mobile electronic devices of the plurality of users of a request to take a digital photograph of various features of the product. For example, a request can includes a request to take a photograph of a brand logo, a particular feature of the product (such as an armrest of a chair), a clothes tag, a product label, and so on. This process allows the online retailer to gather training data for determining whether a new item has that brand or particular feature.

In some embodiments where the requested additional content comprises one or more concrete attributes for the product or one or more abstract attributes for the product, a user can directly type information about the product into his/her mobile electronic device. For example, in some embodiments, a user can directly type information about the product into his/her mobile electronic device within an application or other software installed on the mobile electronic device for the express purpose of collecting content for the online retailer. More particularly, in some embodiments, a user can enter into his/her mobile electronic device for transmission to system 300 (FIG. 3) a product title, one or more concrete attributes, one or more abstract attributes, and/or a product description.

In some embodiments, activity 410 can comprise coordinating a display on mobile electronic devices of a plurality of users of a prompt to enter a product title for the product. The prompt to enter a product title for the product can comprise a request that the plurality of users fill in the blank for certain key components of a good product title. In some embodiments, method 400 can optionally further comprise an activity of coordinating a display of tips for what makes a good product title. For example, the tips can comprise a statement that "good product titles include one or more of the following: a brand, key descriptors, a product type, and/or a model number." The tips also can suggest that the product title be between 40-80 characters and be easy to read.

In some embodiments, activity 410 can comprise coordinating a display on mobile electronic devices of a plurality of users of a prompt to enter one or more concrete attributes for the product. The concrete attributes can comprise attributes that have a definitively correct value. For example, in some embodiments, the concrete attributes can comprise one or more of a brand, a key descriptor, a product type, or a model number, etc. In some embodiments, coordinating a display on mobile electronic devices of a plurality of users of a prompt to enter one or more concrete attributes for the product can comprise coordinating for display a closed list of attributes with fixed value attributes using a dropdown selector. For example, if a requested additional content is color, a dropdown selector with a limited number of colors can be coordinated for display, rather than allow a user to enter open list values of different shades of colors.

In some embodiments, activity 410 can comprise coordinating a display on mobile electronic devices of a plurality of users of a prompt to enter one or more abstract attributes for the product. Abstract attributes for the product can comprise but are not limited to: (1) an occasion, such as "fancy," "casual," "birthday," "anniversary," and the like; (2) a style, such as "modern," "traditional," "chic," and the like; and/or (3) descriptors, such as "cute," "sexy," and the like. In some embodiments, the abstract attributes can be similar to hashtags to allow freeform input, but also autocomplete to existing tags wherever possible to consolidate and/or normalize inputs.

In some embodiments, the plurality of users can comprise at least one of employees for the online retailer or general public. More particularly, the plurality users can comprise employees of the online retailer who own the product, employees of the online retailer who shop at other online or brick and mortar stores, employees of the online retailer who work and/or shop at the online retailer or a brick and mortar store associated with the online retailer, and/or members of the general public that do not work for or are otherwise affiliated with the online retailer.

While in some embodiments, the workflow can comprise an online retailer-driven workflow, in other embodiments, the workflow can comprise a user-driven workflow. In a user-driven workflow, a user decides for which products to collect content, what content to collect for the product, and whether payment for the additional content will be dynamic or static.

In some embodiments, a method can comprise coordinating for a display on the mobile electronic devices of the plurality of users a prompt to enter a product identifier for the product before collecting the additional content. The product identifier can be any product identifier, such as but not limited to a global trade item number (GTIN). After a user of the plurality of users enters the GTIN by taking a photo of a label of the product or manually entering the GTIN, method 400 can optionally comprise an activity of receiving the GTIN from the user. This process sets the product context for the additional content that is collected by the user by associating the content with a product record in the electronic catalog. Method 400 can optionally comprise activities of determining if the GTIN is listed in the electronic catalog and, if so, coordinating a display on the electronic device of the user to confirm whether the product is the same product that is associated with the GTIN in the electronic catalog. In some embodiments, if the product is confirmed to be the same product that is associated with the GTIN in the electronic catalog, method 400 can comprise an activity of coordinating a display of the GTIN on mobile electronic device of the user to set the context for collecting the additional content. Method 400 also can comprise in some embodiments coordinating a display of a small, non-intrusive button on the mobile electronic device of the user proximate the GTIN to allow the user to re-enter and/or re-scan the GTIN. In some embodiments, the GTIN is coordinated for display on an application or other software installed on the mobile electronic device for the express purpose collecting content for the online retailer.

Method 400 can optionally comprise an activity of guiding or otherwise directing the plurality of users to the product located in a physical brick and mortar store of the online retailer. More specifically, method 400 can comprise activities of determining a location of the product in a physical store of the online retailer, and coordinating a sixth display of the location of the product in the physical store of the online retailer on the electronic devices of the plurality of users.

Method 400 can further comprise an activity 415 of receiving the additional content for the product from the mobile electronic devices of the plurality of users. In one embodiment, the additional content can be from only one of the electronic devices of one of the plurality of users. In a different embodiment, the additional content can be from more than one of the electronic mobile devices from more than one of the plurality of users. The additional content can comprise any of the additional content described above.

In embodiments where an image is received as additional content, method 400 can comprise an activity of collecting product information from the image received as additional content. For example, method 400 can comprise activities of parsing textual information for the product from the plurality of photographs, and using the textual information as parsed in the electronic catalog. In some embodiments, method 400 can comprise coordinating a display of the textual information as parsed on a webpage of the online retailer.

Method 400 can further comprise an activity 420 of saving the additional content for the product in a database of the online retailer. More particularly, upon receiving each submission of additional content from one or more users, activity 420 can comprise storing data associated with the additional content in a relational database. In some embodiments, each submission of additional content can comprise a unique key of a user identification associated with the user that submitted the additional content, as well as a GTIN for the product associated with the additional content submitted by the user. The relational database can then be used to power leaderboards and measure user scores in embodiments where providing the additional content is incentivized.

Method 400 can further comprise an activity 425 of matching the additional content for the product to the content of the product in the electronic catalog of the online retailer. In some embodiments, activity 425 can comprise matching the additional content for the product to the content of the product in the electronic catalog of the online retailer using the GTIN of the product submitted by the plurality of users with the additional content to a GTIN of the product stored in the electronic catalog.

Method 400 can further comprise an activity 430 of coordinating a second display of the additional information of the product on the one or more webpages of the online retailer. For example, the additional content submitted by one or more users of the plurality of users can coordinated for display on a webpage of the product on the website of the online retailer. The additional content coordinated for display can comprise any of the additional content described elsewhere in this document.

In some embodiments, method 400 can comprise an activity of determining which particular additional content of the additional content submitted by the plurality of users should be displayed on the webpage for the product. By way of non-limiting example, crowd-source voting can be used to determine which particular additional content of the additional content submitted by the plurality of users should be displayed on the webpage for the product. In some embodiments, method 400 can comprise an activity of selecting voting content from the additional content. The voting content can comprise one or more of (1) a first photograph of the plurality of photographs and at least a second photograph of the plurality of photographs, (2) a first concrete attribute of the plurality of concrete attributes and at least a second concrete attribute of the plurality of attributes, or (3) a first abstract attribute of the plurality of abstract attributes and at least a second abstract attribute of the plurality of abstract attributes.

Method 400 can further optionally comprise an activity of coordinating a fourth display of the voting content as selected on the mobile electronic devices of the plurality of users. Method 400 can further optionally comprise an activity of receiving votes of a preferred content of the voting content from the plurality of users. In this or other embodiments, coordinating the second display of the additional information of the product on the one or more webpages of the online retailer can comprise coordinating the second display of the additional information comprising a highest number of the votes as received from the plurality of users.

In some embodiments, an activity of determining which particular additional content of the additional content submitted by the plurality of users should be displayed on the webpage for the product can comprise validating at least a portion of the additional content submitted by one or more users of the plurality of users. More particularly, the activity of validating at least a portion of the additional content can comprise validating at least a portion of the additional content by coordinating a display of a validation request on one or more of the mobile electronic devices of one or more of the plurality of users. The validation request can comprise a request to validate an image quality of one or more images submitted as additional content by one or more of the plurality of users. For example, the validation request can ask if the one or more images describe the product and/or ask the user to select any blurry images, cut off images, or otherwise unsatisfactory images. The validation request also can comprise a request to validate a quality of a product title submitted as additional content by one or more of the plurality of users. For example, the validation request can ask if the product title accurately describes the product. The validation request also can comprise a request to validate a quality of one or more product attributes submitted as additional content by one or more of the plurality of users. For example, the validation request can ask if the product has the brand entered by a user as additional content, and/or if the product has the color entered by a user as additional content.

In some embodiments, method 400 can comprise an activity of evaluating individual users of the plurality of users based on the additional content submitted by the individual user. For example, method 400 can comprise sampling and measuring additional content submitted by each of the plurality of users relative to other users and/or absolute truth of the product as determined by an expert. In some embodiments, validation of the additional content, as described above, also can be used in evaluating individual users of the plurality of users based on the additional content submitted by the individual user.

In some embodiments, method 400 can comprise an activity of penalizing an individual user of the plurality of users according to results of evaluating the individual user based on the additional content submitted by the individual user. For example, method 400 can comprise penalizing a user of the plurality of users for submitting a user photograph determined to be poor quality. In some embodiments, method 400 can comprise penalizing a user by surfacing a warning to the user with concrete recommendations if the user's score is below a predetermined threshold after evaluation. In some embodiments, method 400 can comprise penalizing a user by withholding payment or points (in a gamification embodiment or in an incentivized system) until the user's score improves if the user's score is below a predetermined threshold after evaluation.

In some embodiments, a user can send content pertaining to a product currently not available in the electronic catalog of the online retailer. In these circumstances, the content transmitted by the user can still be useful to the online retailer. For example, method 400 can optionally further comprise activities of receiving a product identifier for an additional product from one of the mobile electronic devices of one of the plurality of users and determining that the additional product does not match any products in the electronic catalog of the online retailer. When this happens, method 400 can optionally further comprise coordinating a fifth display on the one of the mobile electronic devices of the one of the plurality of users of a request to provide new content for the additional product. The new content can comprise at least one of (1) a photograph of the additional product taken by the one of the plurality of users on the one of the electronic mobile devices, (2) one or more concrete attributes for the additional product, the concrete attributes for the additional product comprising a brand, a key descriptor, a product type, or a model number of the additional product, or (3) one or more abstract attributes for the additional product, the abstract attributes comprises an occasion attribute, a style attribute, or a descriptive attribute of the additional product. Method 400 can further optionally comprise activities of receiving the new content for the additional product from the one of the mobile electronic devices of the one of the plurality of users and saving the new content for the additional product in the database of the online retailer. This new content can be later matched to product identifiers of new products as the online retailer receives the new products and/or makes the new products available on the website of the online retailer or in physical stores of the online retailer.

As previously noted, in some embodiments, method 400 can be incentivized to provide one or more incentives for the plurality of users to provide additional content and high-quality additional content. In embodiments wherein the users comprise employees of the online retailer, the request for additional content can comprise a daily assignment for each user. For example, method 400 can comprise an activity of determining incentives for the plurality of users to provide the additional content for the product. The incentives can be points in a gaming system that lead to other incentives, such as bonus money, gift cards, vacation time, prizes, and the like. In some embodiments, the value of the incentives can be proportional to the importance of the assignment for additional content. In certain embodiments, method 400 can optionally comprise creating a leaderboard of the plurality of users based on the number of points collected and/or a number of products for which users have provided additional content. Method 400 can optionally further comprise an activity of coordinating a seventh display of a reward for providing the additional content for the product on the mobile electronic devices of the plurality of users after receiving the additional content for the product. In some embodiments, a user can accept or reject a request to provide the additional content. Users also can be limited in the number of rejections of requests to provide additional content during a predetermined period of time.

FIG. 5 illustrates a block diagram of a portion of system 300 comprising communications system 310, web server 320, display system 360, and/or product content system 370, according to the embodiment shown in FIG. 3. Each of communications system 310, web server 320, display system 360, and/or product content system 370, is merely exemplary and not limited to the embodiments presented herein. Each of communications system 310, web server 320, display system 360, and/or product content system 370, can be employed in many different embodiments or examples not specifically depicted or described herein. In some embodiments, certain elements or modules of communications system 310, web server 320, display system 360, and/or product content system 370, can perform various procedures, processes, and/or acts. In other embodiments, the procedures, processes, and/or acts can be performed by other suitable elements or modules.

In many embodiments, communications system 310 can comprise non-transitory memory storage module 512. Memory storage module 512 can be referred to as communications module 512. In many embodiments, communications module 512 can store computing instructions configured to run on one or more processing modules and perform one or more acts of method 400 (FIG. 4) (e.g. activity 415 of receiving the additional content for the product from the mobile electronic devices of the plurality of users (FIG. 4), an activity of receiving votes of a preferred content of the voting content from the plurality of users, wherein coordinating the second display of the additional information of the product on the one or more webpages of the online retailer comprises coordinating the second display of the additional information comprising a highest number of the votes as received from the plurality of users, an activity of receiving a product identifier for the product from one of the mobile electronic devices of one of the plurality of users before determining that the content for the product in the electronic catalog for display on the one or more webpages of the online retailer comprises the incorrect content or is the missing content, and an activity of receiving a product identifier for an additional product from one of the mobile electronic devices of one of the plurality of users, an activity of receiving the new content for the additional product from the one of the mobile electronic devices of the one of the plurality of users).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g. activity 410 of coordinating a first display on mobile electronic devices of a plurality of users of a request to provide additional content (FIG. 4), activity 430 of coordinating a second display of the additional information of the product on the one or more webpages of the online retailer (FIG. 4), an activity of coordinating a third display of photo-taking tips on the mobile electronic device of the plurality of users, an activity of coordinating a fourth display of the voting content as selected on the mobile electronic devices of the plurality of users, an activity of coordinating a fifth display on the one of the mobile electronic devices of the one of the plurality of users of a request to provide new content for the additional product, an activity of coordinating a sixth display of the location of the product in the physical store of the online retailer on the electronic devices of the plurality of users, and an activity of coordinating a seventh display of a reward for providing the additional content for the product on the mobile electronic devices of the plurality of users after receiving the additional content for the product).

In many embodiments, product content system 370 can comprise non-transitory memory storage modules 572, 574, 576, and 578. Memory storage module 572 can be referred to as content module 572, memory storage module 574 can be referred to as cataloging module 574, memory storage module 576 can be referred to voting module 576, and memory storage module 578 can be referred to as incentives module 578. In many embodiments, content module 572 can store computing instructions configured to run on one or more processing modules and perform one or more acts of method 400 (FIG. 4) (e.g. activity 405 of determining that content for a product in an electronic catalog for display on one or more webpages of an online retailer comprises incorrect content or is missing content, an activity of penalizing a user of the plurality of users for submitting a user photograph determined to be poor quality, an activity of parsing textual information for the product from the plurality of photographs, an activity of determining that the additional product does not match any products in the electronic catalog of the online retailer, an activity of determining that the additional content influences purchasers to buy the product more than other content of the missing content or the incorrect content, an activity of determining a location of the product in a physical store of the online retailer).

In many embodiments, cataloging module 574 can store computing instructions configured to run on one or more processing modules and perform one or more acts of method 400 (FIG. 4) (e.g. activity 420 of saving the additional content for the product in a database of the online retailer (FIG. 4), activity 425 of Matching the additional content for the product to the content of the product in the electronic catalog of the online retailer (FIG. 4), an activity of using the textual information as parsed in the electronic catalog, and an activity of saving the new content for the additional product in the database of the online retailer). In many embodiments, voting module 576 can store computing instructions configured to run on one or more processing modules and perform one or more acts of method 400 (FIG. 4) (e.g. an activity of selecting voting content from the additional content). In many embodiments, incentives module 578 can store computing instructions configured to run on one or more processing modules and perform one or more acts of method 400 (FIG. 4) (e.g. an activity of determining incentives for the plurality of users to provide the additional content for the product).

Although systems and methods for collecting and updating online product content have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform acts of:
determining that content for a product in an electronic catalog for display on one or more webpages of an online retailer comprises incorrect content or is missing content;
coordinating a first display on one or more mobile electronic devices of one or more users of a request to provide additional content for the product that:

(1) replaces at least a portion of the incorrect content for the product in the electronic catalog of the online retailer; or
(2) provides at least a portion of the missing content for the product in the electronic catalog of the online retailer,
wherein the additional content comprises at least one of:
one or more photographs of the product taken by the one or more users on the one or more mobile electronic devices;
one or more concrete attributes for the product, the one or more concrete attributes comprising at least one of:
a brand of the product;
a key descriptor of the product;
a product type of the product; or
a model number of the product; or
one or more abstract attributes for the product, the one or more abstract attributes comprising at least one of:
an occasion attribute of the product;
a style attribute of the product; or
a descriptive attribute of the product;
receiving the additional content for the product from the one or more mobile electronic devices of the one or more users;
saving the additional content for the product in a database of the online retailer;
matching the additional content for the product to the content of the product in the electronic catalog of the online retailer;
selecting voting content from the additional content, the voting content comprising at least one of:
(1) a first photograph of the one or more photographs;
(2) a first concrete attribute of the one or more concrete attributes; or
(3) a first abstract attribute of the one or more abstract attributes;
coordinating a second display of the voting content, as selected, on the one or more mobile electronic devices of the one or more users;
receiving votes of a preferred content of the voting content from the one or more users; and
coordinating a third display of a highest voted content of the additional content of the product on the one or more webpages of the online retailer.

2. The system of claim 1, wherein:
the additional content comprises the one or more photographs of the product; and
the one or more non-transitory storage modules storing computing instructions are further configured to run on the one or more processing modules and perform acts of:
coordinating a fourth display of photo-taking tips on the one or more mobile electronic devices of the one or more users;
penalizing a user of the one or more users for submitting a user photograph determined to be a poor quality photograph;
parsing textual information for the product from the one or more photographs; and
using the textual information, as parsed, in the electronic catalog.

3. The system of claim 1, wherein
the voting content further comprises at least one of:
(1) a second photograph of the one or more photographs;
(2) a second concrete attribute of the one or more concrete attributes; or
(3) a second abstract attribute of the one or more abstract attributes.

4. The system of claim 1, wherein the one or more non-transitory storage modules storing computing instructions are further configured to run on the one or more processing modules and perform an act of:
receiving a product identifier for the product from a mobile electronic device of the one or more mobile electronic devices of one of the one or more users before determining that the content for the product in the electronic catalog for display on the one or more webpages of the online retailer comprises the incorrect content or is the missing content.

5. The system of claim 1, wherein the one or more non-transitory storage modules storing computing instructions are further configured to run on the one or more processing modules and perform acts of:
receiving a product identifier for an additional product from a mobile electronic device of the one or more mobile electronic devices of a user of the one or more users;
determining that the additional product does not match any products in the electronic catalog of the online retailer;
coordinating a fourth display on the mobile electronic device of the one or more mobile electronic devices of the user of the one or more users of a request to provide new content for the additional product, the new content comprising at least one of:
(1) a photograph of the additional product taken by the user of the one or more users on the mobile electronic device of the one or more mobile electronic devices;
(2) one or more concrete attributes for the additional product, the one or more concrete attributes for the additional product comprising at least one of:
a brand of the additional product;
a key descriptor of the additional product;
a product type of the additional product; or
a model number of the additional product; or
(3) one or more abstract attributes for the additional product, the one or more abstract attributes comprising at least one of:
an occasion attribute of the additional product;
a style attribute of the additional product; or
a descriptive attribute of the additional product;
receiving the new content for the additional product from the mobile electronic device of the one or more mobile electronic devices of the user of the one or more users; and
saving the new content for the additional product in the database of the online retailer.

6. The system of claim 1, wherein the one or more non-transitory storage modules storing computing instructions are further configured to run on the one or more processing modules and perform acts of:
determining that the additional content influences purchasers to buy the product more than other content of the missing content or the incorrect content;
determining a location of the product in a physical store of the online retailer; and
coordinating a fourth display of the location of the product in the physical store of the online retailer on a mobile electronic device of the one or more mobile electronic devices of a user of the one or more users.

7. The system of claim 1, wherein the one or more non-transitory storage modules storing computing instructions are further configured to run on the one or more processing modules and perform acts of:
   determining incentives for the one or more users to provide the additional content for the product; and
   coordinating a fourth display of a reward for providing the additional content for the product on a mobile electronic device of the one or more mobile electronic devices of a user of the one or more users after receiving the additional content for the product from the user of the one or more users.

8. The system of claim 1, wherein the one or more users comprise at least one of:
   employees of the online retailer; or
   general public.

9. The system of claim 1, wherein:
   the one or more users comprise at least one of:
      employees of the online retailer; or
      general public;
   the voting content further comprises at least one of:
      (1) a second photograph of the one or more photographs;
      (2) a second concrete attribute of the one or more concrete attributes; or
      (3) a second abstract attribute of the one or more abstract attributes;
   when the additional content comprises at least the one or more photographs, the one or more non-transitory storage modules storing computing instructions are further configured to run on the one or more processing modules and perform acts of:
      coordinating a fourth display of photo-taking tips on the one or more mobile electronic devices of the one or more users;
      penalizing a user of the one or more users for submitting a user photograph determined to be a poor quality photograph;
      parsing textual information for the product from the one or more photographs; and
      using the textual information, as parsed, in the electronic catalog;
   the one or more non-transitory storage modules storing computing instructions are further configured to run on the one or more processing modules and perform acts of:
      receiving a product identifier for the product from a mobile electronic device of the one or more mobile electronic devices of one of the one or more users before determining that the content for the product in the electronic catalog for display on the one or more webpages of the online retailer comprises the incorrect content or is the missing content;
      receiving a product identifier for an additional product from the mobile electronic device of the one or more mobile electronic devices of the user of the one or more users;
      determining that the additional product does not match any products in the electronic catalog of the online retailer;
      coordinating a fifth display on the mobile electronic device of the one or more mobile electronic devices of the user of the one or more users of a request to provide new content for the additional product, the new content comprising at least one of:
         (1) a photograph of the additional product taken by the user of the one or more users on the mobile electronic device of the one or more mobile electronic devices;
         (2) one or more concrete attributes for the additional product, the one or more concrete attributes for the additional product comprising at least one of:
            a brand of the additional product;
            a key descriptor of the additional product;
            a product type of the additional product; or
            a model number of the additional product; or
         (3) one or more abstract attributes for the additional product, the one or more abstract attributes comprising at least one of:
            an occasion attribute of the additional product;
            a style attribute of the additional product; or
            a descriptive attribute of the additional product;
      receiving the new content for the additional product from the mobile electronic device of the one or more mobile electronic devices of the user of the one or more users;
      saving the new content for the additional product in the database of the online retailer;
      determining that the additional content influences purchasers to buy the product more than other content of the missing content or the incorrect content;
      determining a location of the product in a physical store of the online retailer;
      coordinating a sixth display of the location of the product in the physical store of the online retailer on the mobile electronic device of the one or more mobile electronic devices of the user of the one or more users;
      determining incentives for the one or more users to provide the additional content for the product; and
      coordinating a seventh display of a reward for providing the additional content for the product on the mobile electronic device of the one or more mobile electronic devices of the user of the one or more users after receiving the additional content for the product from the user of the one or more users.

10. A method comprising:
    determining that content for a product in an electronic catalog for display on one or more webpages of an online retailer comprises incorrect content or is missing content;
    coordinating a first display on one or more mobile electronic devices of one or more users of a request to provide additional content for the product that
       (1) replaces at least a portion of the incorrect content for the product in the electronic catalog of the online retailer; or
       (2) provides at least a portion of the missing content for the product in the electronic catalog of the online retailer,
    wherein the additional content comprises at least one of:
       one or more photographs of the product taken by the one or more users on the one or more mobile electronic devices;
       one or more concrete attributes for the product, the one or more concrete attributes comprising at least one of:
          a brand of the product;
          a key descriptor of the product;
          a product type of the product; or
          a model number of the product; or one or more abstract attributes for the product, the one or more abstract attributes comprising at least one of:
   an occasion attribute of the product;
   a style attribute of the product; or
   a descriptive attribute of the product;
receiving the additional content for the product from the one or more mobile electronic devices of the one or more users;
saving the additional content for the product in a database of the online retailer;
matching the additional content for the product to the content of the product in the electronic catalog of the online retailer;
selecting voting content from the additional content, the voting content comprising at least one of:
   (1) a first photograph of the one or more photographs;
   (2) a first concrete attribute of the one or more concrete attributes; or
   (3) a first abstract attribute of the one or more abstract attributes;
coordinating a second display of the voting content, as selected, on the one or more mobile electronic devices of the one or more users;
receiving votes of a preferred content of the voting content from the one or more users; and
coordinating a third display of a highest voted content of the additional content of the product on the one or more webpages of the online retailer.

11. The method of claim 10, wherein:
the additional content comprises the one or more photographs of the product; and
the method further comprises:
   coordinating a fourth display of photo-taking tips on the one or more mobile electronic devices of the one or more users;
   penalizing a user of the one or more users for submitting a user photograph determined to be a poor quality photograph;
   parsing textual information for the product from the one or more photographs; and
   using the textual information, as parsed, in the electronic catalog.

12. The method of claim 10, wherein:
the voting content further comprises at least one of:
   (1) a second photograph of the one or more photographs;
   (2) a second concrete attribute of the one or more concrete attributes; or
   (3) a second abstract attribute of the one or more abstract attributes.

13. The method of claim 10, further comprising:
receiving a product identifier for the product from a mobile electronic device of the one or more mobile electronic devices of one of the one or more users before determining that the content for the product in the electronic catalog for display on the one or more webpages of the online retailer comprises the incorrect content or is the missing content.

14. The method of claim 10, further comprising:
receiving a product identifier for an additional product from a mobile electronic device of the one or more mobile electronic devices of a user of the one or more users;
determining that the additional product does not match any products in the electronic catalog of the online retailer;
coordinating a fourth display on the mobile electronic device of the one or more mobile electronic devices of the user of the one or more users of a request to provide new content for the additional product, the new content comprising at least one of:
   (1) a photograph of the additional product taken by the user of the one or more users on the mobile electronic device of the one or more mobile electronic devices;
   (2) one or more concrete attributes for the additional product, the one or more concrete attributes for the additional product comprising at least one of:
      a brand of the additional product;
      a key descriptor of the additional product;
      a product type of the additional product; or
      a model number of the additional product or
   (3) one or more abstract attributes for the additional product, the one or more abstract attributes comprising at least one of:
      an occasion attribute of the additional product;
      a style attribute of the additional product; or
      a descriptive attribute of the additional product;
receiving the new content for the additional product from the mobile electronic device of the one or more mobile electronic devices of the user of the one or more users; and
saving the new content for the additional product in the database of the online retailer.

15. The method of claim 10, further comprising:
determining that the additional content influences purchasers to buy the product more than other content of the missing content or the incorrect content;
determining a location of the product in a physical store of the online retailer; and
coordinating a fourth display of the location of the product in the physical store of the online retailer on a mobile electronic device of the one or more mobile electronic devices of a user of the one or more users.

16. The method of claim 10, further comprising:
determining incentives for the one or more users to provide the additional content for the product; and
coordinating a fourth display of a reward for providing the additional content for the product on a mobile electronic device of the one or more mobile electronic devices of a user of the one or more users after receiving the additional content for the product from the user of the one or more users.

17. The method of claim 10, wherein the one or more users comprise at least one of:
employees of the online retailer; or
general public.

18. The method of claim 10, wherein:
the one or more users comprise at least one of:
   employees of the online retailer; or
   general public;
the voting content further comprises at least one of:
   (1) a second photograph of the one or more photographs;
   (2) a second concrete attribute of the one or more concrete attributes; or
   (3) a second abstract attribute of the one or more abstract attributes;
when the additional content comprises at least the one or more photographs, the method further comprises:

coordinating a fourth display of photo-taking tips on the one or more mobile electronic devices of the one or more users;

penalizing a user of the one or more users for submitting a user photograph determined to be a poor quality photograph;

parsing textual information for the product from the one or more of photographs; and using the textual information, as parsed, in the electronic catalog;

the method further comprises:

receiving a product identifier for the product from a mobile electronic device of the one or more mobile electronic devices of one of the one or more users before determining that the content for the product in the electronic catalog for display on the one or more webpages of the online retailer comprises the incorrect content or is the missing content;

receiving a product identifier for an additional product from the mobile electronic device of the one or more mobile electronic devices of the user of the one or more users;

determining that the additional product does not match any products in the electronic catalog of the online retailer;

coordinating a fifth display on the mobile electronic device of the one or more mobile electronic devices of the user of the one or more users of a request to provide new content for the additional product, the new content comprising at least one of:

(1) a photograph of the additional product taken by the user of the one or more users on the mobile electronic device of the one or more mobile electronic devices;

(2) one or more concrete attributes for the additional product, the one or more concrete attributes for the additional product comprising at least one of:
a brand of the additional product;
a key descriptor of the additional product;
a product type of the additional product; or
a model number of the additional product or (3) one or more abstract attributes for the additional product, the one or more abstract attributes comprising at least one of:
an occasion attribute of the additional product;
a style attribute of the additional product; or
a descriptive attribute of the additional product;

receiving the new content for the additional product from the mobile electronic device of the one or more mobile electronic devices of the user of the one or more users;

saving the new content for the additional product in the database of the online retailer;

determining that the additional content influences purchasers to buy the product more than other content of the missing content or the incorrect content;

determining a location of the product in a physical store of the online retailer;

coordinating a sixth display of the location of the product in the physical store of the online retailer on the mobile electronic device of the one or more mobile electronic devices of the user of the one or more users;

determining incentives for the one or more users to provide the additional content for the product; and coordinating a seventh display of a reward for providing the additional content for the product on the mobile electronic device of the one or more mobile electronic devices of the user of the one or more users after receiving the additional content for the product from the user of the one or more users.

19. The system of claim 7, wherein the incentives for the one or more users to provide the additional content for the product comprises a gamification of providing the additional content for the product.

20. The method of claim 16, wherein the incentives for the one or more users to provide the additional content for the product comprises a gamification of providing the additional content for the product.

* * * * *